(12) United States Patent
Sala Lluma

(10) Patent No.: US 9,222,463 B2
(45) Date of Patent: Dec. 29, 2015

(54) WIND TURBINE AND METHOD OF OPERATING A WIND TURBINE

(75) Inventor: Marc Sala Lluma, Barcelona (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 45 days.

(21) Appl. No.: 14/114,706

(22) PCT Filed: Jun. 5, 2012

(86) PCT No.: PCT/EP2012/060547
§ 371 (c)(1),
(2), (4) Date: Oct. 29, 2013

(87) PCT Pub. No.: WO2012/168209
PCT Pub. Date: Dec. 13, 2012

(65) Prior Publication Data
US 2014/0070539 A1    Mar. 13, 2014

Related U.S. Application Data

(60) Provisional application No. 61/521,020, filed on Aug. 8, 2011.

(30) Foreign Application Priority Data

Jun. 6, 2011 (EP) .................................... 11382186

(51) Int. Cl.
*F03D 9/00* (2006.01)
*H02P 9/04* (2006.01)
(Continued)

(52) U.S. Cl.
CPC *F03D 7/00* (2013.01); *F03D 9/002* (2013.01); *F03D 9/003* (2013.01); *H02P 3/18* (2013.01); *H02P 9/006* (2013.01); *H02P 9/04* (2013.01);
(Continued)

(58) Field of Classification Search
USPC ....................................................... 290/44, 55
See application file for complete search history.

(56) References Cited

U.S. PATENT DOCUMENTS 4,246,806 A * 1/1981 Reynolds et al. ............... 477/69
4,306,156 A * 12/1981 Monaco et al. .................. 290/17
(Continued)

FOREIGN PATENT DOCUMENTS

EP        2 200 170       6/2010

OTHER PUBLICATIONS

International Search Report and Written Opinion for PCT/EP2012/060547, mailed Oct. 17, 2012, 12 pgs.

*Primary Examiner* — Pedro J Cuevas
(74) *Attorney, Agent, or Firm* — Squire Patton Boggs (US) LLP

(57) ABSTRACT

A method of operating a wind turbine comprising a rotor, a multi winding generator having a plurality of independent sets of control windings and a plurality of independent power electronic converters for controlling each set of control windings independently, the method comprising in a normal operation mode, the plurality of power electronic converters controlling the sets of control windings in substantially the same way, whereas in a positioning mode for positioning a rotor of a wind turbine in one of one or more predetermined angular positions, one of the independent power electronic converters controlling its corresponding set of control windings in a substantially different manner than at least one other independent power electric converter. The invention further relates to a wind turbine adapted to work in at least two different operating modes.

9 Claims, 2 Drawing Sheets

(51) Int. Cl.
  *F03D 7/00* (2006.01)
  *H02P 9/00* (2006.01)
  *H02P 25/22* (2006.01)
  *H02P 3/18* (2006.01)
  *H02P 27/08* (2006.01)

(52) U.S. Cl.
  CPC ........... *H02P 25/22* (2013.01); *F05B 2260/903* (2013.01); *H02P 27/08* (2013.01); *Y02E 10/725* (2013.01)

(56) References Cited

U.S. PATENT DOCUMENTS

| | | | |
|---|---|---|---|
| 4,613,292 A * | 9/1986 | Bernstrom et al. | 418/61.3 |
| 4,906,060 A * | 3/1990 | Claude | 322/29 |
| 5,083,039 A * | 1/1992 | Richardson et al. | 290/44 |
| 5,517,097 A * | 5/1996 | Hayashida | 318/568.22 |
| 5,550,884 A * | 8/1996 | Berney | 377/5 |
| 6,049,187 A * | 4/2000 | Haner | 318/725 |
| 6,137,187 A * | 10/2000 | Mikhail et al. | 290/44 |
| 6,242,884 B1 | 6/2001 | Lipo et al. | 318/808 |
| 6,420,795 B1 * | 7/2002 | Mikhail et al. | 290/44 |
| 6,939,264 B2 * | 9/2005 | Hommes et al. | 477/45 |
| 7,166,003 B2 * | 1/2007 | Motose | 440/1 |
| 7,622,815 B2 * | 11/2009 | Rivas et al. | 290/44 |
| 7,902,686 B2 * | 3/2011 | Andersen et al. | 290/44 |
| 7,942,634 B2 * | 5/2011 | Christensen | 416/1 |
| 8,030,791 B2 * | 10/2011 | Lang et al. | 290/44 |
| 8,227,929 B2 * | 7/2012 | Burra et al. | 290/44 |
| 8,264,094 B2 * | 9/2012 | Rivas et al. | 290/44 |
| 8,350,397 B2 * | 1/2013 | Lang et al. | 290/44 |
| 8,447,480 B2 * | 5/2013 | Usukura | 701/55 |
| 8,604,636 B2 * | 12/2013 | Miyamoto et al. | 290/55 |
| 8,816,625 B2 * | 8/2014 | Kopiness et al. | 318/430 |
| 8,907,509 B2 * | 12/2014 | Brogan et al. | 290/43 |
| 9,018,783 B2 * | 4/2015 | Cooper | F03D 7/02 290/44 |
| 2004/0092361 A1 * | 5/2004 | Hommes et al. | 477/46 |
| 2005/0085141 A1 * | 4/2005 | Motose | 440/87 |
| 2009/0162202 A1 * | 6/2009 | Nies et al. | 416/147 |
| 2009/0197735 A1 * | 8/2009 | Usukura | 477/43 |
| 2012/0056602 A1 * | 3/2012 | Li et al. | 322/89 |
| 2014/0361538 A1 * | 12/2014 | Wagoner et al. | 290/44 |
| 2015/0137520 A1 * | 5/2015 | Garcia | H02J 3/1885 290/44 |
| 2015/0168918 A1 * | 6/2015 | Lagorgette | G04C 17/0058 368/37 |

* cited by examiner

WIND TURBINE AND METHOD OF OPERATING A WIND TURBINE

This application claims the benefit of European Patent Application EP11382186 filed 6 Jun. 2011 and U.S. Provisional Patent Application Ser. No. 61/251,020 filed 8 Aug. 2011.

The present invention relates to a wind turbine and to a method of operating a wind turbine rotor.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

Occasionally, maintenance which requires interruption of the operation of the wind turbine may be required. In order to ensure that a wind turbine rotor cannot rotate during such maintenance, a rotor locking system may be provided. Such a rotor locking system may e.g. comprise one or more bores or apertures in a rotor hub, in which a bolt or pin or similar can be introduced from the nacelle. The rotor may thus be locked with respect to the nacelle. Alternative locking systems are also known.

Generally, such rotor locking systems will require that the rotor be positioned in one of one or more predetermined rotor positions in which the rotor lock can function properly. For example, in case of three-bladed wind turbines, a rotor may be stopped in a "Y"-disposition (also sometimes referred to as "bunny ears" disposition) or in a "reversed Y"-disposition. For both dispositions, three angular positions are in principle available, In order to slow down a rotor and position the rotor in a predetermined position, it is known to use a mechanical brake acting directly or indirectly on a part of the drive train. It may however be complicated to bring the rotor to a halt in exactly the right angular position using such a brake system. Similarly, if a rotor is already halted, but is not in the right position, it may be difficult to set the rotor into a controlled rotation again, and achieve the correct park position quickly.

U.S. 2009/0162202 discloses a method of positioning a wind turbine rotor in a predetermined angular position by using the generator of the wind turbine as a motor and controlling the torque of the generator when functioning as a motor.

It is an object of the present invention to provide an improved method for positioning a wind turbine rotor allowing a very precise positioning.

SUMMARY OF THE INVENTION

In a first aspect, the present invention provides a method of operating a wind turbine comprising a rotor, a multi winding generator having a plurality of independent sets of control windings and a plurality of independent power electronic converters for controlling each set of control windings independently. The method comprises controlling the sets of control windings in substantially the same way in a normal operation mode, and one of the independent power electronic converters controlling its corresponding set of control windings in a substantially different manner than at least one other independent power electric converter in a positioning mode.

In this aspect, the fact of having a plurality of separately controllable winding sets is used in the positioning mode for providing a more precise control of a generator (and thus the rotor hub and blades) so as to easily position the wind turbine rotor in a predetermined position. Additionally, during normal operation, the separate winding sets work together. The performance of the generator is thus not affected during normal operation.

In this respect, the term "control winding" is used to indicate those windings of a motor/generator which cause the electromagnetic field that determines the operation of a motor/generator. For example, in an AC synchronous generator with a permanent magnet rotor, the windings of the stator would clearly be the control windings. In another example, in an AC induction motor, the windings (of the stator) that are controlled and cause the induction of the windings on the rotor would be considered to be the control windings. In a further example, in a Doubly Fed Induction Generator (DFIG), commonly used in wind turbines, the rotor windings may be connected to the grid via slip rings and back-to-back voltage source converter(s) that control both the rotor and the grid currents. The control windings in this case would be the rotor windings.

Further, a "set of control windings" is used to refer to a set of windings which is controlled by the same power electronic converter. Such a set may include e.g. a single winding in a one phase implementation and may include e.g. three windings in a three-phase implementation.

In some embodiments, one of the power electronic power converters generates a torque in its corresponding set of control windings to substantially compensate the instantaneous aerodynamic torque in the positioning mode. Alternatively, two or more of the power electronic converters together generate a torque in their corresponding sets of control windings to substantially compensate the instantaneous aerodynamic torque. An aspect of these embodiments is that the remaining power electronic converters (and corresponding windings) can be used exclusively for positioning, without taking any instantaneous loads on the rotor into account. The input for the control of these remaining power electronic converters may then be e.g. the instantaneous position and/or velocity of the rotor.

In some embodiments, at least one of the other power electronic converters generates a forward torque in its corresponding set of control windings. And in some embodiments, one of the other power electronic converters generates a rearward torque in its corresponding set of control windings. In embodiments of the invention, the power electronic converters may be simplified if a corresponding winding set is destined to perform only in one direction.

In another aspect, the invention provides a wind turbine comprising a rotor, a multi winding generator having a plurality of independent sets of control windings, and a plurality of independent power electronic converters for controlling each set of control windings independently, wherein the generator and independent power electronic converters are adapted to work in at least two different operational modes: in at least one of said operational modes, the independent power electronic converters all operate in substantially the same way, and in at least one other operational mode, the independent power electronic converters do not all operate in substantially the same way.

In this aspect, a multi winding generator is used in a beneficial way in a wind turbine. The several windings may work together e.g. during normal (variable speed) operation to maximize the electricity generated and may be used separately to provide precise control e.g. for positioning of the rotor.

In some embodiments, one or more proximity sensors may be provided in a first plane (e.g. the nacelle or generator) and one or more elements to be sensed in a second plane (e.g. the rotor hub). For example, capacitive or inductive sensors may be used. The sensors may be used in the control of the multi winding generator to determine an instantaneous position and/or speed of the wind turbine rotor, which may serve as input in e.g. a PID control method for the positioning of the rotor.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
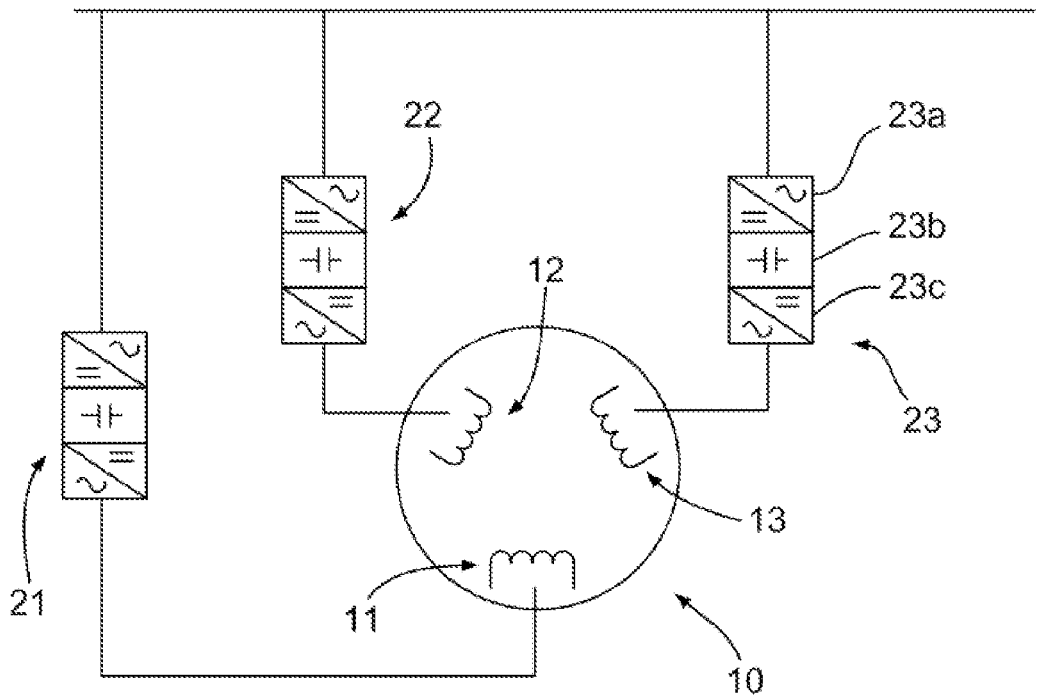
FIGS. 1a and 1b illustrate a first embodiment of a generator that may be used in embodiments of the invention.

FIG. 1a illustrates a multi winding generator 10 that comprises three independent sets of control windings 11, 12 and 13. The generator may e.g. comprise a rotor carrying a plurality of permanent magnets. The generator stator comprises three sets of windings which may be controlled separately to together establish the electrical torque provided by the generator.

Each of the winding sets 11 may e.g. comprise three windings, one for every phase. Each of the winding sets 11, 12, 13 is controlled separately by a power electronic converter, 21, 22 and 23 respectively. Such a power electronic converter may be a variable frequency drive (also often referred to as, "variable speed drive" or "frequency converter"), comprising a rectifier 23a, a DC-link 23b and an inverter 23c. AC power may be supplied to the rectifier 23a, and variable voltage in the windings of the generator may be provided by Pulse Width Modulation (PWM).

It is well known that the electric torque applied to a generator of a wind turbine may be used to control the operation of the wind turbine. During normal operation, the frequency converters may control their corresponding sets of windings in substantially the same way (equal amounts of torque are provided by the sets). The result is that the three separate converters and the three separate sets of windings work as a unit.

Through proper control of the frequency converters, the generator may also be driven as a motor, absorbing electricity instead of generating it. Furthermore, it will be possible to drive the generator both clockwise and counterclockwise.

When the rotor needs to be positioned and fixed in a certain predetermined angular position, the fact of having separately controllable windings may be used advantageously: one of the sets of windings may e.g. be used to continuously compensate the instantaneous aerodynamic torque. These windings would thus basically work as a brake. In this embodiment, the other two sets of windings may be used to position the rotor in a precise manner. The control of these windings does not have to take the aerodynamic torque into account, since that torque is already being compensated. Instead these windings may be controlled using the instantaneous position of the rotor and/or the instantaneous speed of the rotor as input. A PID algorithm may be used in this control.

In one embodiment, one of the remaining sets may be used to exclusively drive the generator in a forward direction. In this sense, "forward" may be understood as the normal rotational direction of the generator. And the other winding set may be used to exclusively drive the generator in a rearward direction. This combination allows a good control over the generator (and thereby the rotor hub and blades) in all conditions, regardless of the instantaneous position of the hub. A further advantage of this particular arrangement is that the converter of at least one of the winding sets, which always only needs to provide torque in one direction, may be simplified (two quadrants, instead of four quadrants). In an alternative embodiment, the two remaining winding sets may be used in a combined drive.

In a further alternative embodiment, only two winding sets (e.g. three-phase) are provided and in the positioning mode, one of them is used to compensate the aerodynamic torque, whereas the other one is used for fine positioning.

A further aspect of the shown embodiments is that redundancy is provided in the wind turbine generator. For example, during normal operation of the wind turbine, if there is a problem with one of the winding sets, the others may be used to control the generator.

Figure 1B:
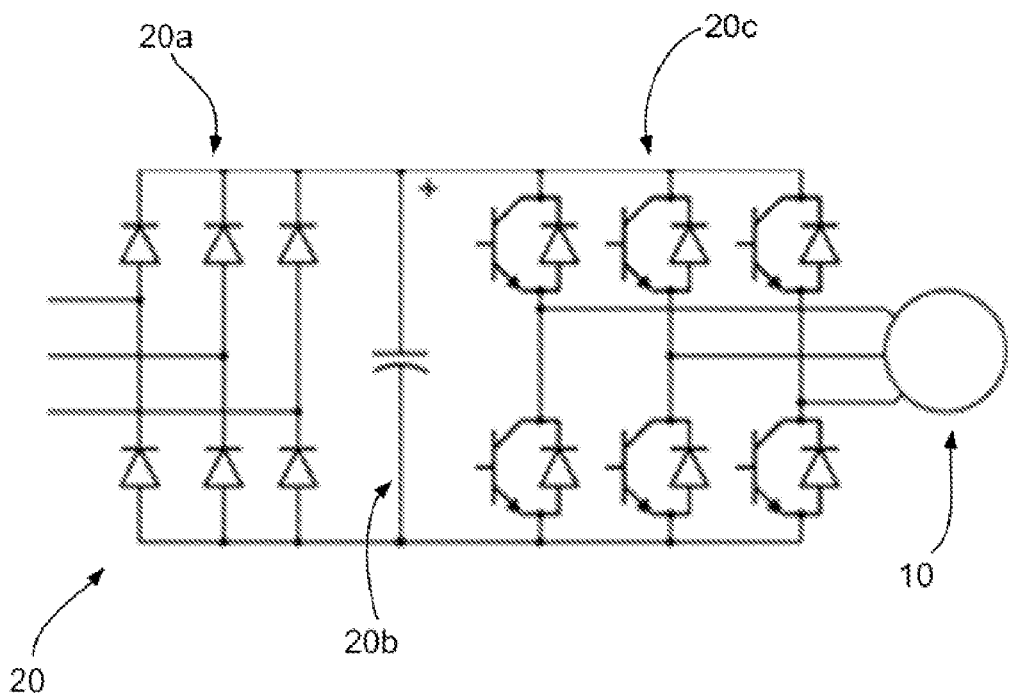

FIG. 1b illustrates one of the frequency converters 20, in case a three-phase implementation is used. The frequency converter shown comprises diode bridges for the rectifier 20a, DC-link 20b, and a plurality of IGBT's for the inverter 20c.

Figure 2:
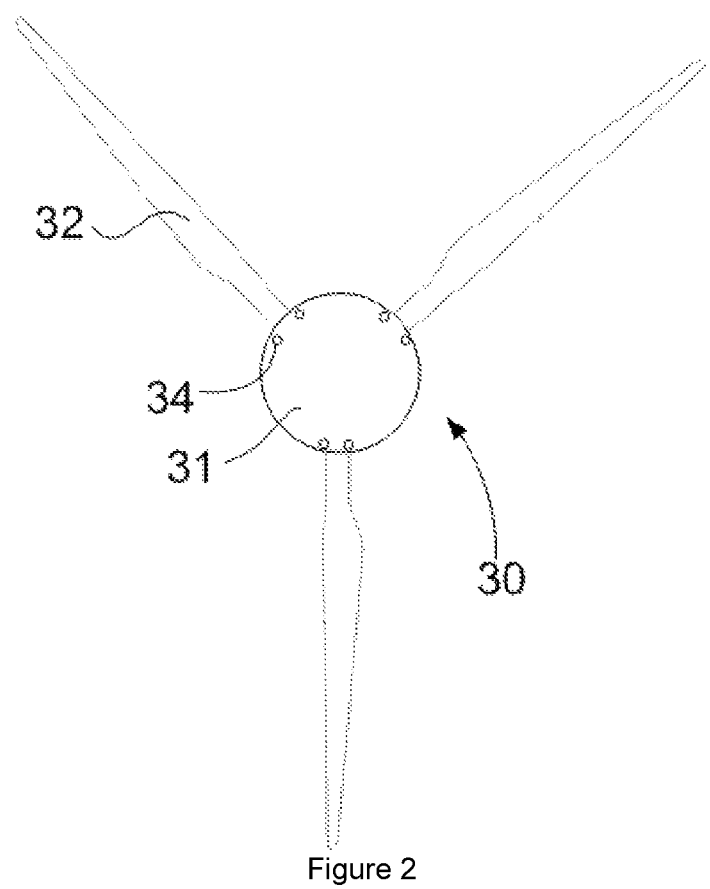
FIG. 2 schematically illustrates a sensor arrangement for a wind turbine hub that may be used in embodiments of the invention.

FIG. 2 schematically illustrates an example of sensor arrangement for a wind turbine hub that may be used in embodiments of the invention. In order to ensure precise positioning of a wind turbine rotor, several kinds of sensing arrangements may be used.

On a nacelle or on a generator, one or more proximity sensors (e.g. inductive or capacitance sensors) may be arranged, preferably at least partly in proximity of a rotor locking mechanism. In a plane 31 of the rotor hub 30 carrying a plurality of blades, (metallic) elements 34 that can be detected by the proximity sensors are provided. In preferred examples, these elements are provided on each side of the blade, such that the approach of the hub towards an angular position may be noted through registration of a first element; and if measurements are received from both elements, the blade is positioned in between the sensors.

In alternative embodiments, other types of (proximity) sensors may be used to determine a position of the rotor. Furthermore, the sensors may be provided in a plane on the hub, whereas the elements to be detected are arranged on the nacelle or on the generator. Also, the number of sensors and precise angular position may be varied in different embodiments.

It will be clear that the methods and systems described herein may be used both for positioning a rotor in a unique predefined position, and for positioning it in one of a plurality of predefined positions. It will furthermore be clear, that any kind of rotor locking system may be used in embodiments of the invention.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind turbine including a rotor, a multi winding generator having a plurality of independent sets of control windings and a plurality of independent power electronic converters for controlling each set of control windings independently, the method comprising:
in a normal operation mode, the plurality of power electronic converters controlling the sets of control windings in substantially the same way, and
in a positioning mode for positioning a rotor of a wind turbine in one of one or more predetermined angular positions, one of the independent power electronic converters controlling its corresponding set of control windings in a substantially different manner than at least one other independent power electric converter, wherein
in the positioning mode, one or more of the power electronic converters generates a torque in its corresponding set of control windings to substantially compensate for an instantaneous aerodynamic torque, and at least one of the other power electronic converters generates a forward torque in its corresponding set of control windings.

2. A method according to claim 1, wherein in the positioning mode, the input for one or more of the power electronic converters is the instantaneous speed and/or the instantaneous position and/or the instantaneous torque of the rotor.

3. A method according to claim 1, wherein in the positioning mode, a PID algorithm is used in the control of at least one of the sets of control windings.

4. A wind turbine, comprising:
a rotor, a multi winding generator having a plurality of independent sets of control windings, and a plurality of independent power electronic converters for controlling each set of control windings independently, wherein
the generator and independent power electronic converters are adapted to work in at least two different operational modes, and wherein
in at least a first operational mode, the independent power electronic converters all operate in substantially the same way, and
in at least a second operational mode, the independent power electronic converters do not all operate in substantially the same way, wherein
the second operational mode is a positioning mode for positioning a rotor in one of one or more predefined angular positions, and wherein
in the positioning mode one or more of the power electronic converters generates a torque in its corresponding set of control windings to substantially compensate for an instantaneous aerodynamic torque, and at least one of the other power electronic converters generates a rearward torque in its corresponding set of control windings.

5. A wind turbine according to claim 4, further comprising a locking mechanism for fixing the wind turbine rotor in a predetermined position.

6. A wind turbine according to claim 5, wherein the locking mechanism comprises an aperture provided on a rotor hub, and an insertion element provided on a nacelle or generator.

7. A wind turbine according to claim 4, further comprising one or more proximity sensors in a first plane and one or more elements to be sensed in a second plane.

8. A wind turbine according to claim 4, wherein the independent power electronic converters are variable frequency drives.

9. A method of operating a wind turbine including a rotor, a multi winding generator having a plurality of independent sets of control windings and a plurality of independent power electronic converters for controlling each set of control windings independently, the method comprising:
in a normal operation mode, the plurality of power electronic converters controlling the sets of control windings in substantially the same way, and
in a positioning mode for positioning a rotor of a wind turbine in one of one or more predetermined angular positions, one of the independent power electronic converters controlling its corresponding set of control windings in a substantially different manner than at least one other independent power electric converter, and
wherein in the positioning mode, the generator is driven as a motor.

* * * * *